I. V. NEWSOM.
Animal-Trap.
No. 160,115
Patented Feb. 23, 1875.
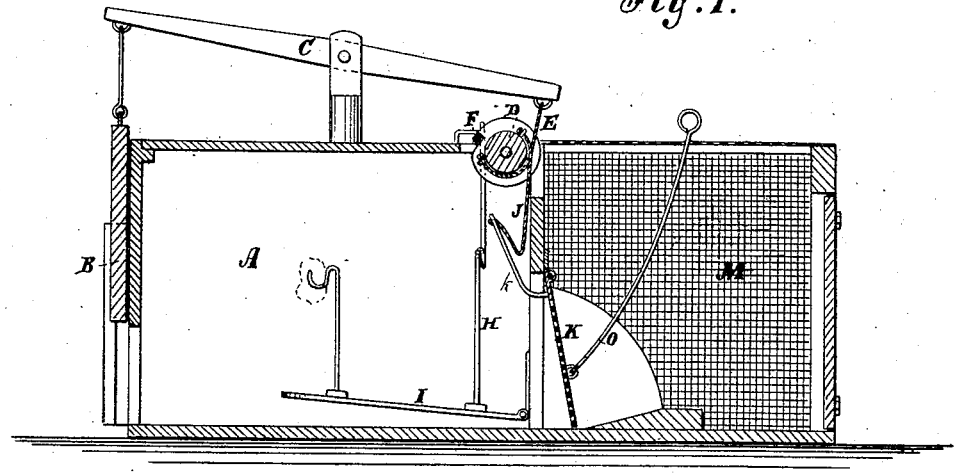
Fig. 1.
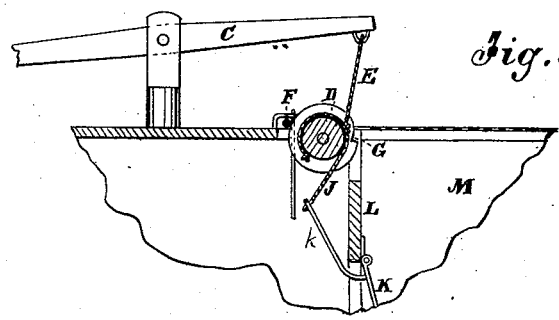
Fig. 3.
Fig. 2.
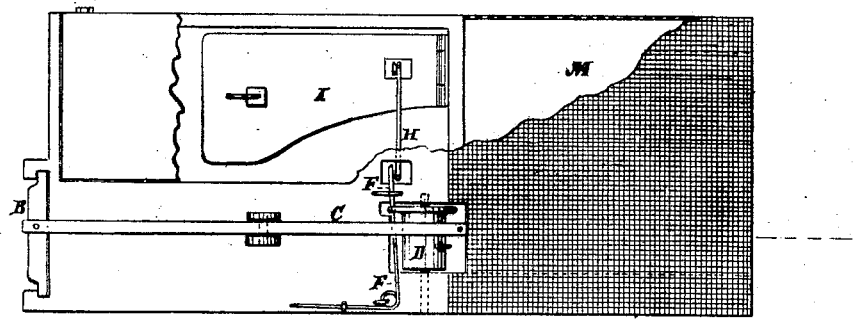
WITNESSES:
A Bennenendorf.
A. J. Terry
INVENTOR:
Isaac V. Newsom
BY
Munn & Co.
ATTORNEYS.

UNITED STATES PATENT OFFICE.

ISAAC V. NEWSOM, OF EATONTON, GEORGIA.

IMPROVEMENT IN ANIMAL-TRAPS.

Specification forming part of Letters Patent No. 160,115, dated February 23, 1875; application filed September 26, 1874.

*To all whom it may concern:*

Be it known that I, ISAAC V. NEWSOM, of Eatonton, Putnam county, Georgia, have invented a new and Improved Rat-Trap, of which the following is a specification:

The invention will first be fully described, and then pointed out in the claims.

Figure 1 is a longitudinal sectional elevation of my improved trap, showing the positions of the parts when set. Fig. 2 is partly a plan view and partly a horizontal section; and Fig. 3 is a detail section, showing the positions when the trap is sprung.

Similar letters of reference indicate corresponding parts.

A is the dark baiting-room, into which the animal enters through the falling door B, which is suspended from the lever C, the lever being connected to the roller-catch D by a cord E, which is wound on the roller, so as to keep the door open when the trap is set, which is done by turning the roller around from left to right until the spring F springs into the notch G.

To trip the door and let it fall, the spring is thrown out of the notch by the arm H on the treadle I, on which the bait is fixed, so that the animal will readily pull the treadle down. When the door is thus tripped and falls, it turns the roller back, and winds on the cord F, which is connected to the door K in the partition L, between the baiting-room and the light room M. This door is made to rise and fall, so that the animal will open it readily in his efforts to escape to the light, and it will close self-actingly after he has passed through. By the connection of this door to the roller-catch, the animal is made to set the trap again at the moment he escapes from the baiting-room, and thus leave it ready for catching another.

The door K has also a line, O, connected to it, and passing up through the top of the trap for setting it by hand.

Having thus described my invention, I claim as new and desire to secure by Letters Patent—

1. The combination, with door-lever C, having cord E, and door-arm having cord J, with the notched drum D, held by a spring-latch, F, and the treadle-arm H, as shown and described, for the purpose specified.

2. The door K, provided with handle O, and arm having cord J, combined with the lever-cord E and drum D, as shown and described, so that the trap may be opened by hand, as set forth.

ISAAC V. NEWSOM.

Witnesses:
WM. W. TURNER,
J. B. REESE.